US011016720B2

United States Patent
Jannace et al.

(10) Patent No.: US 11,016,720 B2
(45) Date of Patent: May 25, 2021

(54) AUDIO SYSTEM

(71) Applicant: Bose Corporation, Framingham, MA (US)

(72) Inventors: Matthew Jannace, Bolton, MA (US); Joseph Bermann, Bolton, MA (US); Kathryn Ward, Brighton, MA (US); Graeme Reed, Charlestown, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/010,245

(22) Filed: Jun. 15, 2018

(65) Prior Publication Data

US 2019/0384562 A1  Dec. 19, 2019

(51) Int. Cl.
*G06F 3/16* (2006.01)
*G05B 15/02* (2006.01)
(Continued)

(52) U.S. Cl.
CPC ............. *G06F 3/165* (2013.01); *G05B 15/02* (2013.01); *G06F 3/0482* (2013.01);
(Continued)

(58) Field of Classification Search
CPC .......... G06F 21/10; G06F 3/165; G06F 12/00; G06F 16/635; G06F 3/0482; G06F 9/451; H04L 65/60; H04L 2012/2849; H04L 63/20; H04L 65/1069; H04R 2420/07; H04R 3/12; H04R 5/02; H04W 12/06; H04W 48/18; H04W 4/80; H04W 84/12; H04H 20/18
(Continued)

(56) References Cited

U.S. PATENT DOCUMENTS 9,330,169 B2 *  5/2016  Gomes-Casseres .... G06F 17/00
10,075,908 B2 *  9/2018  Young ................... H04W 48/18
2018/0020400 A1  1/2018  Young

OTHER PUBLICATIONS

The International Search Report and the Written Opinion of the International Searching Authority dated Mar. 12, 2020 for PCT Application No. PCT/IB2019/001301.

* cited by examiner

*Primary Examiner* — Duc Nguyen
*Assistant Examiner* — Alexander L Eljaiek
(74) *Attorney, Agent, or Firm* — Brian M. Dingman; Dingman IP Law, PC (57) ABSTRACT

An audio system with an audio playback device that is configured to operatively connect to a digital audio source for playback of content from the digital audio source and a software program configured to run on a separate computer, wherein the software program provides a user interface configured to present to a first authorized user a selection of whether the audio playback device will be public and thus available to other authorized users or private and thus not available to other authorized users. In response to the first authorized user making a selection of whether the audio playback device will be public or private, an audio playback device access control is provided, wherein the access control is configured such that if the audio playback device is public, other authorized users are able to access and control the public audio playback device and if the audio playback device is private, other authorized users are not able to control the private audio playback device.

16 Claims, 8 Drawing Sheets

(51) Int. Cl.
*H04L 29/06* (2006.01)
*G06F 3/0484* (2013.01)
*G06F 3/0482* (2013.01)

(52) U.S. Cl.
CPC .......... *G06F 3/04847* (2013.01); *G06F 3/167* (2013.01); *H04L 63/102* (2013.01)

(58) Field of Classification Search
USPC ....................... 700/94; 709/223, 231; 726/27
See application file for complete search history.

AUDIO SYSTEM

BACKGROUND

This disclosure relates to audio systems, audio playback devices, audio servers, and related methods.

Audio playback devices can be used by more than one person. Sharing settings among the users inherently limits the customization available to each user.

SUMMARY

All examples and features mentioned below can be combined in any technically possible way.

In one aspect, an audio system includes an audio playback device that is configured to operatively connect to a digital audio source for playback of content from the digital audio source and a software program configured to run on a separate computer. The software program provides a user interface configured to present to a first authorized user a selection of whether the audio playback device will be public and thus available to other authorized users or private and thus not available to other authorized users. In response to the first authorized user making a selection of whether the audio playback device will be public or private, an audio playback device access control is provided. The access control is configured such that if the audio playback device is public other authorized users are able to access and control the public audio playback device and if the audio playback device is private other authorized users are not able to control the private audio playback device.

Embodiments may include one of the following features, or any combination thereof. The access control may be further configured such that any authorized user with access to an audio playback device is able to make a selection to change a public audio playback device to private or change a private audio playback device to public. An authorized user may be the holder of an account that comprises an identification of any audio playback device that can be accessed by the authorized user. The access control may be further configured such that an authorized user can add any public audio playback device to the authorized user's account. The access control may be further configured such that if a particular public audio playback device is made private, all authorized users who had added the particular audio playback device to the respective authorized user's account while the audio playback device was public are still able to access the particular audio playback device after it has been made private.

Embodiments may include one of the above and/or below features, or any combination thereof. The audio system may further comprise a plurality of audio playback devices that are each either public or private, and the access control may be further configured such that all other authorized users can access all public audio playback devices and no other authorized users can access any private audio playback device. Multiple audio playback devices can be grouped to function together as a unit and the access control may be further configured such that if a first authorized user does not have access to all of the audio playback devices in the unit, then the first authorized user is invited to add one or more of the audio playback devices of the unit to the first authorized user's account if those one or more of audio playback devices of the unit are public. The access control may be further configured such that if a first authorized user does not have access to all of the audio playback devices in the unit, then the first authorized user's access to the unit is restricted if any audio playback devices in the unit are set to private and have not already been associated with the first authorized user's account. Multiple audio playback devices can be grouped to function together as a unit and the access control may be further configured such that if the unit is public other authorized users are able to access and control the unit and if the unit is private other authorized users are not able to control the unit. The access control may be further configured such that any authorized user with access to a unit can individually access and control all audio playback devices of the unit.

Embodiments may include one of the above and/or below features, or any combination thereof. An authorized user may be the holder of an account that comprises an identification of any audio playback device that can be accessed by the user and an identification of account based digital audio services with which the authorized user has an account. The audio playback device may be configured to store information that allows the audio playback device to access account based digital audio services with which the authorized user has an account. The access control may be further configured such that when another particular authorized user gains access to an audio playback device the information that allows the audio playback device to access account based digital audio services with which the particular authorized user has an account is stored in the audio playback device. The audio playback device may be further configured to operatively connect to a virtual personal assistant that is configured to communicate with the audio playback device so as to control the audio playback device by voice commands. The audio playback device may be further configured to store an assignment of an entity associated with a digital audio source to a preset indicator on the audio playback device, and the preset may be available to any authorized user with access to the audio playback device.

In another aspect, an audio system server includes a processor and instructions stored on computer-readable media that, when executed, cause the processor to receive from a first authorized user information regarding a selection of whether of an audio playback device that is configured to operatively connect to a digital audio source for playback of content from the digital audio source will be public and thus available to other authorized users or private and thus not available to other authorized users and in response establish an audio playback device access control wherein if the audio playback device is public other authorized users are able to access and control the public audio playback device and if the audio playback device is private other authorized users are not able to control the private audio playback device. The server may receive unique identifying information from the audio playback device and authenticate the device before it associates the audio playback device to one of the authorized users' accounts.

In another aspect, a method for establishing an accessibility to authorized users of an audio playback device that is configured to operatively connect to a digital audio source for playback of content from the digital audio source includes presenting to a first authorized user a selection of whether the audio playback device will be public and thus available to other authorized users or private and thus not available to other authorized users. In response to the first authorized user making a selection of whether the audio playback device will be public or private an audio playback device access control is established wherein if the audio playback device is public other authorized users are able to access and control the public audio playback device and if the audio playback device is private other authorized users are not able to control the private audio playback device. Presenting to a first authorized user a selection of whether the audio playback device will be public and thus available to other authorized users or private and thus not available to other authorized users may comprise presenting on a user interface of a computing device an interactive display that provides the selection.

DETAILED DESCRIPTION

This disclosure is based, at least in part, on the realization that it can be beneficial to configure an audio system with one or more audio playback devices (such as wireless speakers) such that the speakers can be associated with multiple different user accounts. This allows people who are associated (such as family members) to each maintain a separate account that includes their desired music sources, playlists, favorites, and the like, all while sharing one or more speakers.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another or may be physically separate. One element may perform the actions of more than one block. Audio signals may be encoded or not and may be transmitted in either digital or analog form. Conventional audio signal processing equipment and operations are in some cases omitted from the drawing.

Figure 1:
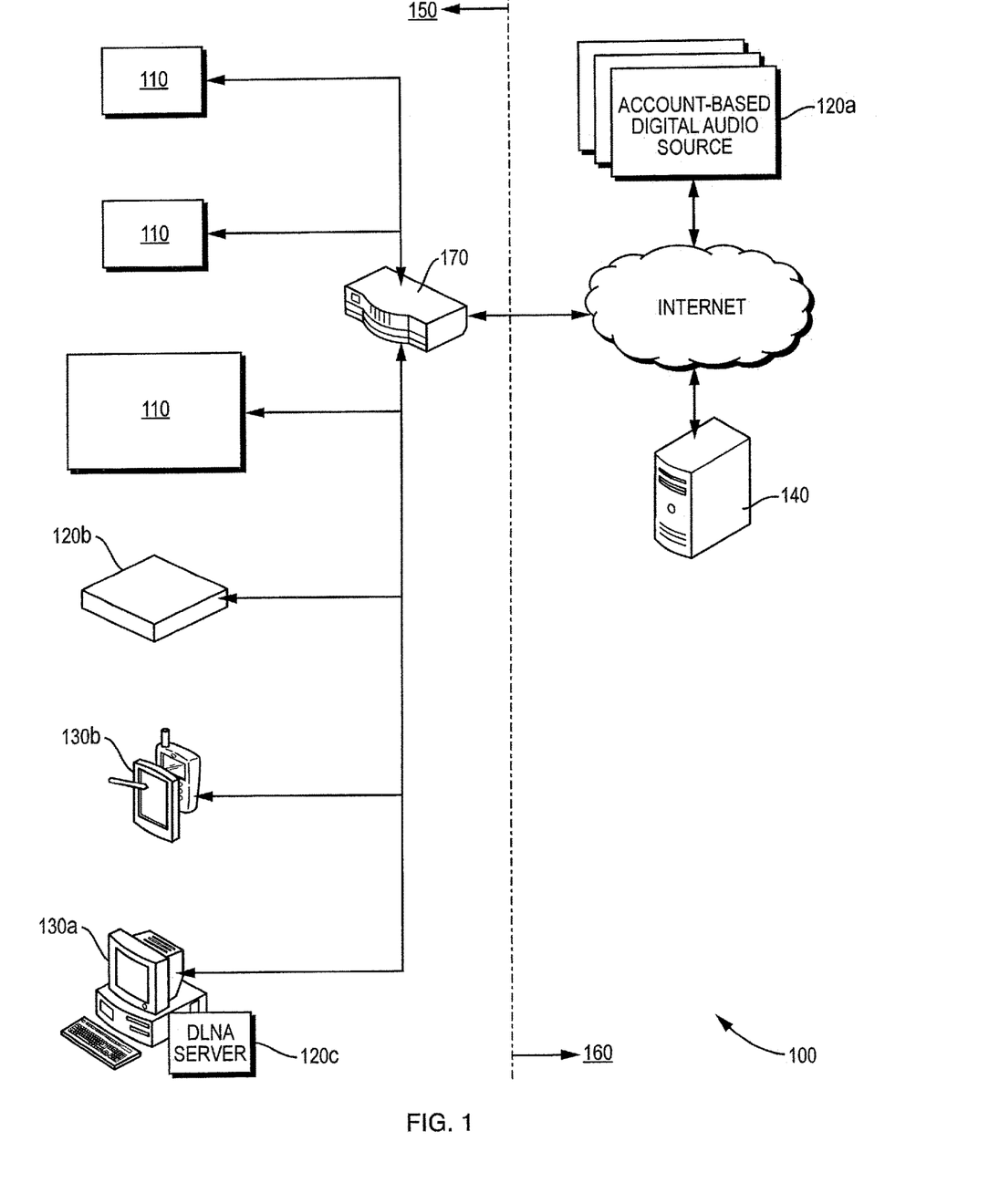
FIG. 1 is a schematic diagram of an audio system.

Referring to FIG. 1, an audio system 100 for the delivery of digital audio (e.g., digital music) provides for easy, quick access to a variety of digital audio sources. At a very high level, there are four main categories of devices in the audio system 100: (i) audio playback devices 110; (ii) digital audio sources 120a, 120b, 120c (collectively referenced as 120); controllers 130a and 130b (collectively referenced as 130); and a server 140. Server 140 may represent a cloud-storage device or service.

The audio playback devices 110 are electronic devices which are capable of rendering audio content. These devices can access stored audio content (e.g., remotely stored audio content) and stream it for playback. In some cases, the audio playback devices 110 may also be capable of playing locally stored content. These devices render audio with the help of audio codecs and digital signal processors (DSPs) available within.

The audio playback devices 110 can communicate with each other. For example, each audio playback device 110 can communicate with the other audio playback devices 110 within the audio system 100 for synchronization. This can be a synchronization of device settings, such as synchronization of preset assignments, or, for synchronization of playback (e.g., such that all or a subset of the audio playback devices 110 play the same content simultaneously and synchronously).

The digital audio sources 120 are devices and/or services that provide access to one or more associated entities for supplying content (e.g., audio streams) to the audio playback devices 110, and which can be located remotely from the audio playback devices 110. An "entity," as used herein, refers to a grouping or collection of content for playback. Exemplary entities include account-based digital audio sources and user defined playlists. "Content" is data (e.g., an audio track) for playback. "Associated entity" refers to an entity that is associated with a particular audio source. For example, if the digital audio source 120 is an account-based digital audio source or service, such as Pandora®, an example associated entity would be a radio station provided by Pandora®.

For the purposes of the audio system 100, audio streams are considered to be data. They are processed as digital information that is converted to analog before presentation. Data streaming is the method by which data is moved from an audio source 120 to an audio playback device 110. Typically, there are two models for this data movement, push and pull. The audio system 100 is capable of managing this audio (data) streaming in both fashions.

The digital audio sources 120 each maintain a repository of audio content which can be chosen by the user to play. The digital audio sources 120 can be based on the Digital Living Network Alliance® (DLNA) or other Web based protocols similar to the Hypertext Transfer Protocol (HTTP). Some of the devices and services in this category include account-based digital audio sources 120a such as Pandora®, Spotify®, and vTuner®; network-attached storage (NAS) devices 120b, and a media server daemon 120c (e.g., provided as a component of a computer-based controller).

The digital audio sources 120 can include user defined playlists of digital music files available from network audio sources such as network-attached storage (NAS) devices 120b, and a DLNA server 120c which may be accessible to the audio playback devices 110 over a local area network such as a wireless (Wi-Fi) or wired (Ethernet) home network 150, as well as account-based digital audio sources 120a such as Pandora®, vTuner®, Spotify®, etc., which are accessible to the audio playback devices 110 over a wide area network 160 such as the Internet.

The controllers 130 are responsible for controlling the audio playback devices 110 and for browsing the audio sources 120 in the audio system 100. Some of the devices in this category include desktop computers 130a, laptop computers, and mobile devices such as smart phones and tablets 130b. These devices control the audio playback devices 110 via a wireless communication interface (e.g., the IEEE 802.11 set of specifications, which include but are not limited to IEEE 802.11n and 802.11ac, Bluetooth LE, infrared, etc.). The controllers 130 serve as an online management tool for a user's network enabled audio playback devices 110. The controllers 130 provide interfaces which enable the user to perform one or more of the following: setup a connection to a Wi-Fi network; create an audio system account for the user, sign into a user's audio system account and retrieve information; add or remove an audio playback device 110 on a user's audio system account; edit an audio playback device's name, and update software; access the audio sources (via the audio playback devices 110); assign an entity (e.g., a playlist or radio station) associated with one of the audio sources 120 to a preset indicator; browse and select recents, where "recents" refers to recently accessed entities; use transport controls (play/pause, next/skip, previous), view "Now Playing" (i.e., content currently playing on an audio playback device 110) and album art; adjust volume levels; and other actions that are detailed herein.

The server 140 is preferably a cloud-based server which contains (e.g., within an account database) information related to a user's audio system account. This includes user account information such as the list of the audio playback devices 110 within the system 100, device diagnostic information, preset assignments, etc. The server 140 will be connected to by the audio playback devices 110 and by the controllers 130 (e.g., by primary network controllers) for the purpose of preset management, as well as management of audio sources 120 and management of the user's audio system account. Generally, the controllers 130 (e.g., network controllers 130a, 130b) will login to the server 140 with a user's login details and 'sync down' the required information to work with.

The audio playback devices 110 and one or more of the controllers 130 are coupled to a local area network (LAN) 150. Other devices such as one or more of the digital audio sources (e.g., a network-attached storage (NAS) device 120b) may also be coupled to the LAN 150. The LAN 150 may be a wired network, a wireless network, or a combination thereof. In one example, the devices (e.g., audio playback devices 110 and controllers 130 (e.g., primary and secondary controllers 130a, 130b)) within the LAN 150 are wirelessly coupled to the LAN 150 based on an industry standard such as the IEEE specifications discussed herein. The LAN 150 may represent a network within a home, an office, or a vehicle. In the case of a residential home, the audio playback devices 110 may be arranged in different rooms (e.g., kitchen, dining room, bedroom, basement, etc.) within the home. The devices within the LAN 150 connect to a user supplied access point 170 (e.g., a router) and subsequently to a wide area network (WAN) 160 (e.g., the Internet) for communication with the other digital audio sources 120 (e.g., account-based digital audio sources 120a) and the server 140.

The audio system 100 can provide for the management of presets (a/k/a preset assignments) and recents. Presets are a set of (e.g., six) user-defined shortcuts to content, intended to provide quick access to entities associated with the digital music sources 120 from (1 of 6) preset indicators present on each of the audio playback devices 110. In some cases, the preset indicators can be hardware buttons. Alternatively, the preset indicators may be virtual buttons defined by regions on a touch sensitive display. The individual preset indicators can be denoted with numerical identifiers.

The preset indicators of the audio playback devices 110 provide access to their respectively assigned entities irrespective of the associated digital audio source. More specifically, the preset indicators can provide for single press access to the respectively assigned entities, irrespective of the digital audio source. That is, a single press of a preset indicator will start the streaming and rendering of content from an entity assigned to that preset indicator regardless of the audio source providing that entity. In that regard, the presets are said to be source agnostic in that they behave in the same manner regardless of the audio source. In some cases, the single press access can be facilitated with the distribution of tokens for accessing account based audio sources which normally require a user to login with account credentials. The presets can be stored in the cloud with a copy of a playback device's preset assignments stored locally on that playback device 110.

This disclosure describes actions that can be taken regarding audio playback devices of system 100, including but not limited to actions that can be taken by authorized users (i.e., users with an audio system account). Audio system accounts can store user-related data. Account data is typically stored in a cloud server. In one non-limiting example a user audio system account can include an identification of any audio playback device that can be accessed by the user, an identification of account-based digital audio services with which the user has an account, and tokens that represent the user's credentials with such digital audio services. Accounts can also include other information as described elsewhere herein.

Following are some of the actions that are provided for in the audio system. The actions can be presented to authorized users and accomplished using software that is configured to run on a computer that is separate from the audio playback device. The computer typically comprises a processor and associated memory that is part of one or more of server 140 and controllers 130. The computer is configured to communicate with an audio device. A graphical display associated with a controller or an audio device (also termed herein a speaker or a product) can be used as a user interface to the computer running the software program. Where an application ("app") is described, the application is generally a software program that is intended to be run on a control device, such as a smartphone, a tablet, a laptop, or a PC, for example, that is in communication with an audio playback device and a server. As described above, the network is typically a Wi-Fi network to which the devices (the speakers and the controllers) are functionally connected, and that is configured to communicate with a server (typically but not necessarily via the cloud). For actions that involve a server, the server can run software that is used to accomplish the necessary server functions. Actions include but are not limited to the following.

Link Product:

An authorized user looks in the app (e.g., the GUI of a smartphone or tablet), sees an audio playback device (a product) that has been discovered on the local network, selects the product to be added to the user's audio system account by clicking on an "Add" button or the like. The product may now be accessed and controlled by the user. The controllers do not allow for the selection of private audio playback devices and so private devices cannot be linked to a user's account. The app will send a "Link Product" request to the cloud server. When the cloud server handles a "Link Product" request, it must check whether the specified product is already "owned" by any other authorized user. This can be accomplished with a database that associates authorized users with particular audio devices, which each have a unique identifier. The database can be modeled as a "many-to-many" relationship. The server can receive this product unique identifier from the product and authenticate the product before it associates the product to the user's account. The authentication and association can be accomplished by comparing the unique identifier with the database of unique identifiers.

If the product is not already associated with a user, the specified user is added to the database as the owner of the product. Otherwise the product already has an owner, so the second user (and any subsequent user) is added as "co-owner" of the product. The first user remains as owner. The maximum number of owners/co-owners can in one non-limiting example be limited to 50 (1 owner+49 co-owners). When a 51st is added, then the oldest co-owner (based on creation time) will be dropped. This provides a reasonable limit while preventing an attack/bug which could cause unbounded growth. The audio playback device can be configured to store information such as tokens that allows the audio playback device to access account based digital audio services with which the authorized user has an account. The access control can be further configured such that when another authorized user gains access to an audio playback device, the information that allows the audio playback device to access account based digital audio services with which the particular authorized user has an account (e.g., the tokens described above) are stored in the audio playback device.

Un-Link Product:

The user decides to remove a product which they no longer want to use, so they look in the app, find the particular product, and click "Remove". The app will send an "Un-Link Product" request to the cloud server. When the cloud server handles an "Un-Link Product" request, there are two main cases: un-linking a co-owner and un-linking the owner. Un-linking a co-owner involves removing the user's co-owner-association to the product. For un-linking the owner there are multiple possibilities. In one instance, the cloud server will remove the owner's association to the product, and automatically promote the "oldest" co-owner to owner. "Oldest" means the co-owner who's been associated to the product for the longest time (i.e., whose association to the product was made the earliest). In an alternative, if there are no co-owners the cloud server will remove the owner's association to the product. If there is one co-owner, the cloud server will automatically promote that co-owner to owner. If there are two or more co-owners, the cloud server will return a specific error to the App's original request which includes the names of all co-owners. The App will prompt the user to pick one of the co-owners to be promoted to owner, then send a second request "UnlinkProduct(newOwner)" which tells the cloud server which co-owner to promote to owner.

Public/Private Toggle on a Product:

The user can toggle a product to be either public or private. See FIG. 2 (described in more detail below) for a non-limiting example of a GUI that facilitates this selection. Selection of a product as private results in the app not displaying the product as a discovered device. The cloud server will reject "LinkProduct" commands for a private device. This allows the owner or a co-owner of a device to prevent others from using or controlling a "private" device. The public/private toggle thus gives the user control over whether a particular product is shareable. The public/private selection thus accomplishes access control over the device. The default value is "public." Public means that the product can be seen by and accessed by (i.e., added to the audio account of) any other authorized user. When a product is switched from public to private, the existing co-owners will remain; they won't be automatically removed. The owner or any co-owner can change the public/private toggle; this operation is not restricted to just the owner.

Get Product:

The user is looking in the app at one or more products (already associated or new). The app will send a "Get Product" request to the cloud server for the product (either for a single product or for all products associated with the user). When the cloud server handles a "Get Product" request, in the data returned in the response, the cloud server will include a list of all (other) owners of the product. This will allow the app to add any decorations (such as user profile pictures, names, initials, iconography or the like) to products that may be needed to convey whether they're owned by other users.

Naming a Shared Product:

A product can have one name and any owner/co-owner can set it.

Get Product List:

The user associates a product to their account. All affected products will send a "Get Product List" request to the cloud server so they learn which services are available to them. When the cloud server handles a "Get Product List" request the data returned in the response will include the music service providers (MSPs) for the one owner of the product (there are no co-owners). This will also return data for any accounts (e.g. Alexa VSP) associated directly with the product (not via a user). In addition, the data can include the MSPs for all co-owners of the product.

Presets:

Anyone with access to a particular product can save/play presets for it. For example, any user can save/play a preset, even if that preset represents music for a different user's MSP. When the user saves a preset, the app or product will tell the cloud server to store that information. The cloud server will set the presets for only the specified product, although a L/R pair might be a special case. When the user plays a preset, the cloud server is not involved. The preset data can be stored at the user level and/or the product level.

Left/Right Pair:

Two speakers can be paired together into a Left/Right stereo pair. In the app, the two speakers will appear as one object (or unit) to the user. Once a user has added both speakers of the pair, the user can disband the pair, at which point the two speakers will be displayed as separate speakers.

Multi-Room:

Multiple speakers can be grouped together into a multi-room group which will all play the same music at the same time. As with the left/right pair, the speakers of a group are displayed as one object. In order for a user to add the group, the user must add each speaker of the group to the user's account. Any user of the group can disband or reconfigure the group.

Bulk-Add Products in a Multi-Room Group:

If a user has already added a product to their account, but that product is part of a group which includes other products they haven't added yet, the app will provide (e.g., via the controller GUI) an easy one-click option to "Add all other speakers in group" to the user's account. Also, if a user sees a set of products discovered on the local network which are configured together in a group, the app will provide an easy one-click option to "Add all speakers in the group" to the user's account. In order to provide the "Add all speakers in the group" functionality each product tells the app if it's participating in a group and which other products are in the group The app shows the products as a group to the user and asks if they should all be added. The app issues a single command to the cloud server to "bulk-add" the products to the person's account. Alternatively, the app can issue the "Link Product" command to the cloud server repeatedly. When the cloud server handles an "Add all speakers in the group" request, it will essentially perform the "Link a Single Product" operation for each speaker. The access control can be configured such that if a first authorized user does not have access to all of the audio playback devices in the unit, then the first authorized user's access to the unit is restricted if any audio playback devices in the unit are set to private and have not already been associated with the first authorized user's account. "Restricted" can mean that access is prevented altogether or limited only to access via buttons on one of the devices of the unit.

Virtual Personal Assistant—Voice Control:

Third Party Distributed Audio relates to when a user speaks a command to one product containing a microphone (e.g., a personal assistant such as Amazon Echo, or Amazon Dot) to control audio playback on a separate audio playback device. "Account Linking" is a process which connects a user's Amazon account to their audio system account. "Discovery" is a process by which Amazon learns of the target speakers to which audio can be sent (e.g. the speaker in my kitchen which I've nicknamed "My Kitchen"). Discovery needs to run each time a new device is linked to an Amazon third-party distributed audio account.

With Voice Service, the user speaks a command to a product (containing a microphone and voice-service-enabled) which is sent to the Amazon cloud for processing. Device Linking is a process which associates a user's Amazon account with a particular product, so they can use voice service on it. The cloud server will persist this association of Amazon account to product. Note that Amazon allows only one Amazon account to be associated with a particular product. "Household Mode" is Amazon's way of allowing multiple people to share products for voice service in a household. Multiple people can group their Amazon accounts together in a "household", which lets them say, e.g., "switch to Joe's account" to specify which household account to use for processing commands in the Amazon cloud (e.g. to access their personal calendar, shopping list, or music). Any owner or co-owner can add, remove, and manage the virtual personal assistant associated with the product.

A product can only be associated with a single voice service or third-party distributed audio account at a time. The owner and co-owners can add or remove such an account at any time, so that the product can be linked to a desired voice service account. The product is still able to play content through any authorized user's audio account. An owner or a co-owner can be allowed to enable or disable a speaker microphone.

Reset to Factory Defaults:

This can be necessary when one user gives a product to another user. The second user should begin their ownership of the product with a clean slate. A user can perform a factory reset on a product to actively disassociate the owner and any and all co-owners. The reset can occur by the simultaneous press of multiple buttons on the product, or by another specific action. For example, all the party guests have left my home, so I want to disassociate all co-owners from my product to make sure no-one can continue using it. When a product is reset to factory defaults all configuration is deleted, so that the product is effectively the same as when it was un-boxed and set it up for the first time. Upon factory reset the product will clear out its internal configuration and the cloud server will also clear out its saved configuration for that product. To make that happen, the product needs to send a command (or a flag) to the cloud server the next time it communicates with the cloud server after a reset.

Figure 2:
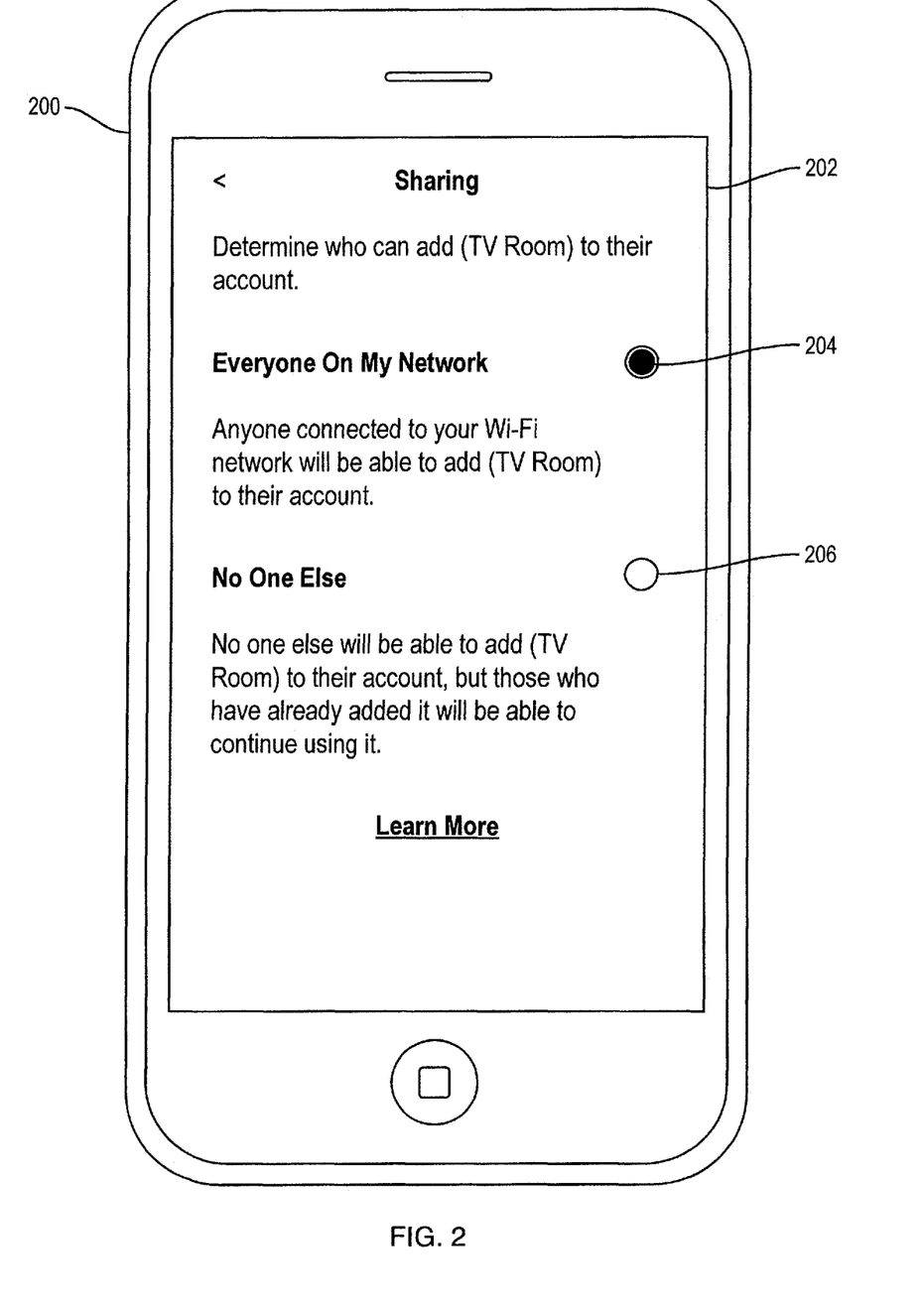
FIG. 2 shows a graphical user interface (GUI) for a controller of an audio system.

FIG. 2 is a screenshot of a "sharing" screen 202 of an audio system control device 200, which may be a tablet or smartphone as two non-limiting examples of control devices, which are further described elsewhere herein. Sharing screen 202 is one manner of providing a graphical user interface (GUI) that allows an authorized user (an audio system account holder) to select whether an audio playback device is available to everyone connected to the Wi-Fi network in use (i.e., is "public") (selection 204) or whether the device is available to no one else (i.e., is "private") (selection 206). There are myriad other manners by which the user could be presented with this public/private selection. The selection can be presented when the speaker is first setup, i.e., when the speaker is first connected to the cloud server. Any public speaker is visible to any account holder who is on the network (i.e., any authorized user). A public speaker can be made private by any authorized user after setup, using screen 202 or a similar selection screen.

Figure 3:
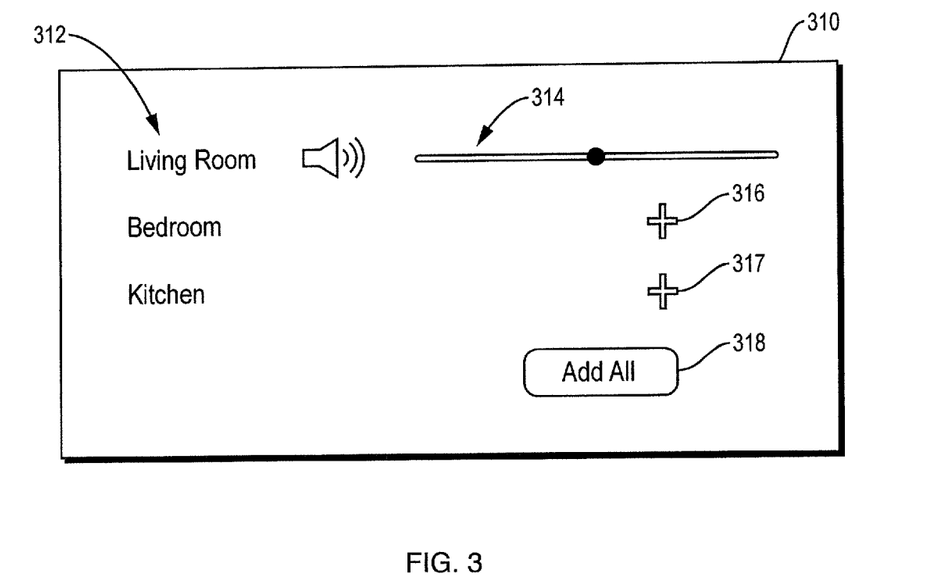
FIG. 3 shows another GUI for a controller of an audio system.

FIG. 3 is a screenshot of another screen 310 of an audio system control device, which may be a tablet or smartphone as two non-limiting examples of control devices, which are further described elsewhere herein. Screen 310 is one non-limiting manner of providing a GUI that allows an authorized user (an audio system account holder) to select one or more additional audio devices to add to the user's account. Other manners of presenting public devices and groups or units of devices, and allowing the user to select them, would be apparent to one skilled in the field based on the present disclosure and are included within the scope of the disclosure. The GUI allows adding devices one at a time, or all together. In the illustrated example, screen 310 displays a list 312 of three named devices—"living room," "bedroom," and "kitchen." The living room device is linked and so a volume bar 314 is shown and the words "living room" are bright. The bedroom and kitchen devices are public but are not linked and so the words are grayed-out. An icon (in this case a plus sign 316 and 317) is associated with each unlinked product. If the user taps the icon, the device is added to the user's account. Multiple devices (e.g., all of the devices that are available to the user but not yet linked, or the devices of a group or unit) can be added all at once by tapping the "add all" button 318.

Figure 4:
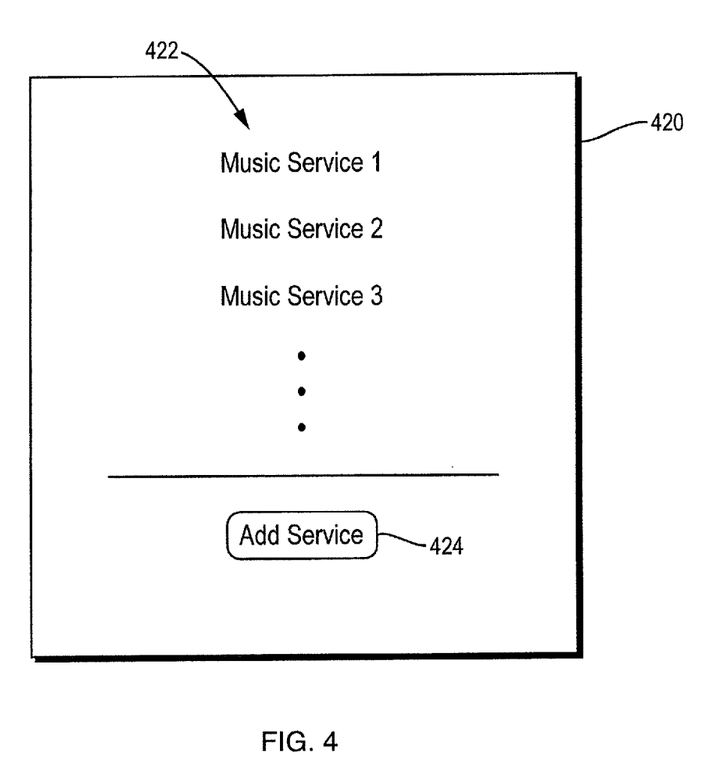
FIG. 4 shows another GUI for a controller of an audio system.

FIG. 4 is a screenshot of another screen 420 of an audio system control device, which may be a tablet or smartphone as two non-limiting examples of control devices, which are further described elsewhere herein. Screen 420 is one non-limiting manner of providing a GUI that allows an authorized user to select one or more additional account-based digital audio services to add to the user's audio system account. Other manners of presenting account-based digital audio services and allowing the user to select them, would be apparent to one skilled in the field based on the present disclosure and are included within the scope of the disclosure. In the illustrated example, screen 420 displays a list 422 of three named services. The currently enabled services that are already linked are displayed brightly. Other available but as yet not linked services are displayed grayed-out. An icon (in this case an "add service" button 424) can be touched to add any available service. If the user taps the service name then button 424, the service is added to the user's account.

Figure 5A:
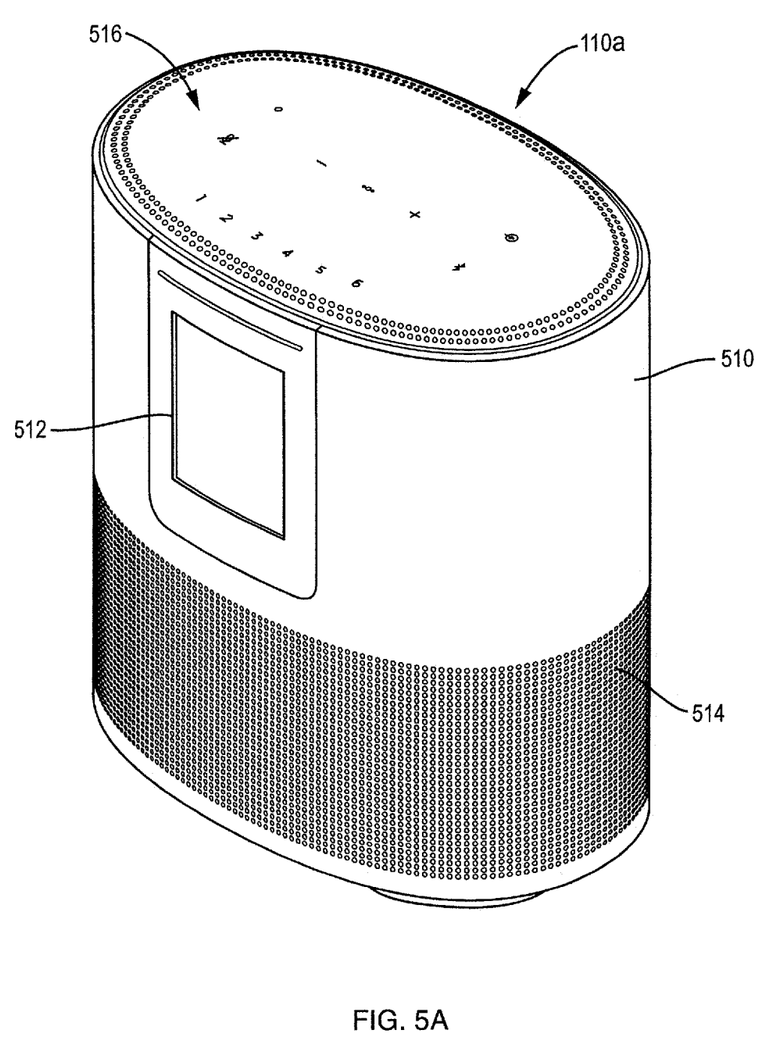
FIGS. 5A and 5B are perspective and top plan views, respectively, of an exemplary audio playback device for the audio system.
Figure 5B:
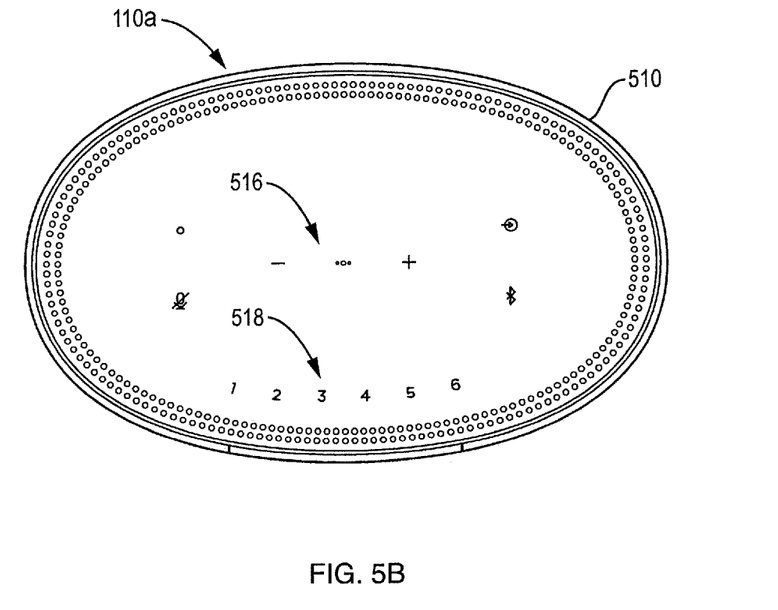
Figure 5C:
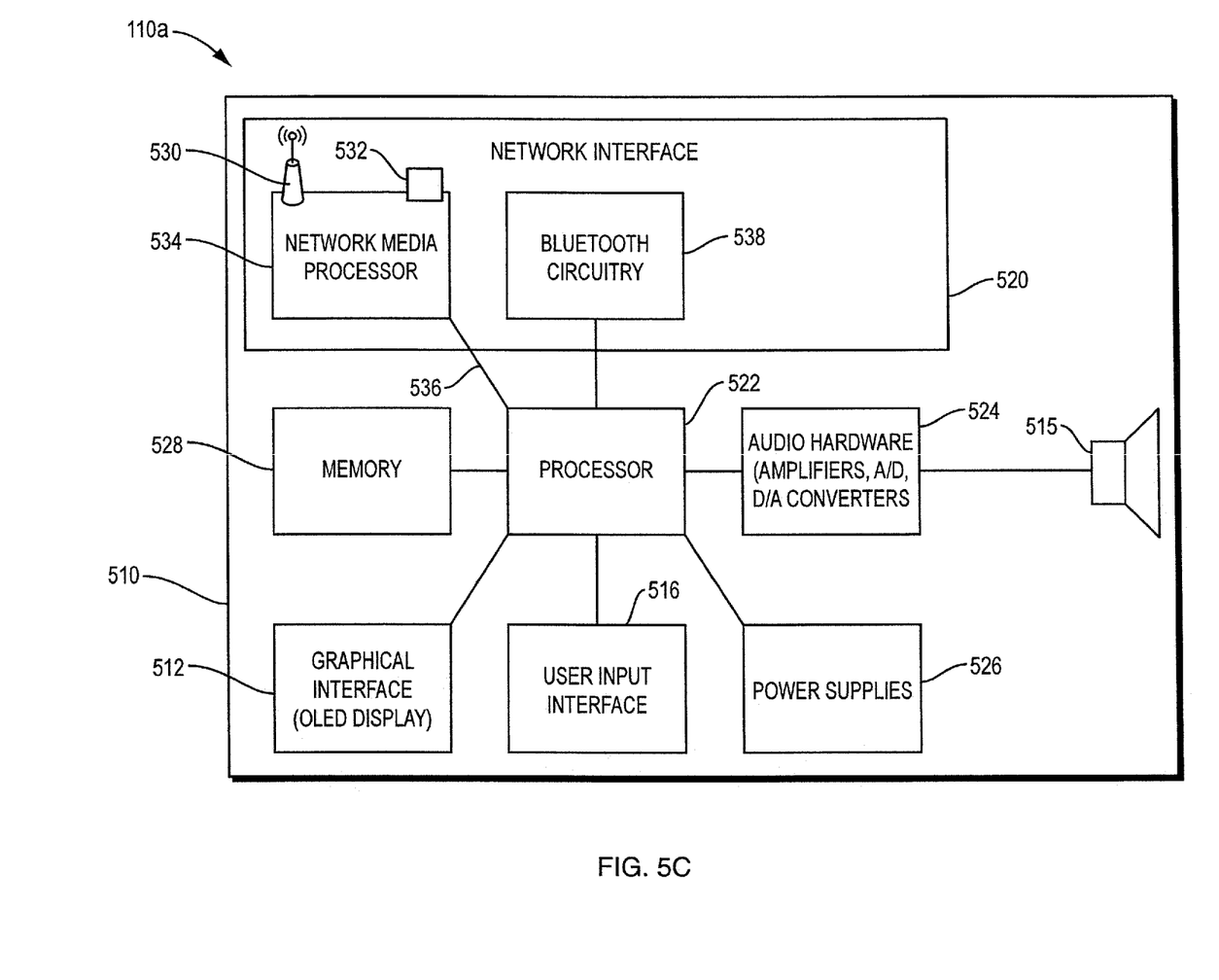
FIG. 5C is a functional block diagram of the audio playback device of FIGS. 5A and 5B.

An exemplary audio playback device 110*a* will now be described in greater detail with reference to FIGS. 5A through 5C. Referring to FIG. 5A, an audio playback device 110*a* includes an enclosure 510 and on the enclosure 510 there resides a graphical interface 512 (e.g., an OLED display) which can provide the user with information regarding currently playing ("Now Playing") music and information regarding the presets. A screen 514 conceals one or more electro-acoustic transducers 515 (FIG. 5C). The audio playback device 110*a* also includes a user input interface 516. As shown in FIG. 5B, the user input interface 516 includes a plurality of preset indicators 518, which are buttons in the illustrated example. The preset indicators 518 (numbered 1-6) provide the user with easy, one press access to entities assigned to those buttons. That is, a single press of a selected one of the preset indicators 518 will initiate streaming and rendering of content from the assigned entity.

The assigned entities can be associated with different ones of the digital audio sources (e.g., items 120*a*, 120*b*, 120*c*, FIG. 1) such that a single audio playback device 110*a* can provide for single press access to various different digital audio sources. In one example, the assigned entities include at least (i) user defined playlists of digital music and (ii) account-based digital audio sources. In another example, the digital audio sources include a plurality of account-based digital audio sources, and the assigned entities include individual radio stations provided by those account-based digital audio sources.

Notably, the preset indicators 518 operate in the same manner, at least from the user's perspective, regardless of which entities are assigned and which of the digital audio sources provide the assigned entities. That is, each preset indicator 518 can provide for single press access to its assigned entity whether that entity is a user-defined playlist of digital music provided by an NAS device or an Internet radio station provided by an account-based digital audio source.

With reference to FIG. 5C, the audio playback device 110*a* also includes a network interface 520, a processor 522, audio hardware 524, power supplies 526 for powering the various audio playback device components, and memory 528. Each of the processor 522, the graphical interface 512, the network interface 520, the audio hardware 524, the power supplies 526, and the memory 528 are interconnected using various buses, and several of the components may be mounted on a common motherboard or in other manners as appropriate.

The network interface 520 provides for communication between the audio playback device 110*a* and the controller (e.g., items 130*a-b*, FIG. 1), the server (item 140, FIG. 1), the audio sources (items 120, FIG. 1) and other audio playback devices 110 via one or more communications protocols. The network interface 520 may provide either or both of a wireless interface 530 and a wired interface 532. The wireless interface 530 allows the audio playback device 110*a* to communicate wirelessly with other devices in accordance with a communication protocol such as such as the IEEE protocols discussed above. The wired interface 532 provides network interface functions via a wired (e.g., Ethernet) connection.

In some cases, the network interface 520 may also include a network media processor 534 for supporting Apple Air-Play® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the LAN 150, the user can then stream music to the network connected audio playback devices 110*a* via Apple AirPlay®. Notably, the audio playback device 110*a* can support audio-streaming via AirPlay® and/or DLNA's UPnP protocols, and all integrated within one device.

All other digital audio coming from network packets comes straight from the network media processor 534 through a USB bridge 536 to the processor 522 and runs into the decoders, DSP, and eventually is played back (rendered) via the electro-acoustic transducer(s) 515.

The network interface 520 can also include a Bluetooth circuitry 538 for Bluetooth applications (e.g., for wireless communication with a Bluetooth enabled audio source such as a smartphone or tablet).

Streamed data pass from the network interface 520 to the processor 522. The processor 522 can execute instructions within the audio playback device (e.g., for performing, among other things, digital signal processing, decoding, and equalization functions), including instructions stored in the memory 528. The processor 522 may be implemented as a chipset of chips that include separate and multiple analog and digital processors. The processor 522 may provide, for example, for coordination of other components of the audio playback device 110*a*, such as control of user interfaces, applications run by the audio playback device 110*a*.

The processor 522 provides a processed digital audio signal to the audio hardware 524 which includes one or more digital-to-analog (D/A) converters for converting the digital audio signal to an analog audio signal. The audio hardware 524 also includes one or more amplifiers which provide amplified analog audio signals to the electroacoustic transducer(s) 515 for playback. In addition, the audio hardware 524 may include circuitry for processing analog input signals to provide digital audio signals for sharing with other devices in the acoustic system 100.

The memory 528 stores information within the audio playback device 110*a*. In this regard, the memory 528 may store account information, such as the device(s) identification, voice (virtual personal assistant) services, preset, and recent information. The memory 528 may also provide storage for "tokens" for facilitating single press access to the digital audio sources 120 (e.g., the account-based digital audio sources of FIG. 1). A token, as used herein, is a unique identifier that may be provided by the digital audio source 120 (e.g., an account-based digital audio source) and which allows the digital audio source 120 to recognize the audio playback device 110*a* as being associated with a user's account with the digital audio source 120 and without requiring the user to enter credentials (e.g., user name, password, etc.) each time the audio playback device 110*a* attempts to access the digital audio source 120.

The memory 528 may include, for example, flash memory and/or non-volatile random access memory (NVRAM). In some implementations, instructions (e.g., software) are stored in an information carrier. The instructions, when executed by one or more processing devices (e.g., the processor 522), perform one or more processes, such as those described above. The instructions can also be stored by one or more storage devices, such as one or more computer- or machine-readable mediums (for example, the memory 528, or memory on the processor). The instructions may include instructions for performing decoding (i.e., the software modules include the audio codecs for decoding the digital audio streams), as well as digital signal processing and equalization.

The instructions may also include instructions for enabling certain "browsing" functionality. That is, at least in some cases, the controllers (items 130a, b, FIG. 1) serve as graphical remote controls for the audio playback devices 110 and do not communicate with the digital audio sources 120 (FIG. 1) directly, but, instead, communicate with the digital audio sources 120 via the audio playback devices 110.

Figure 6:
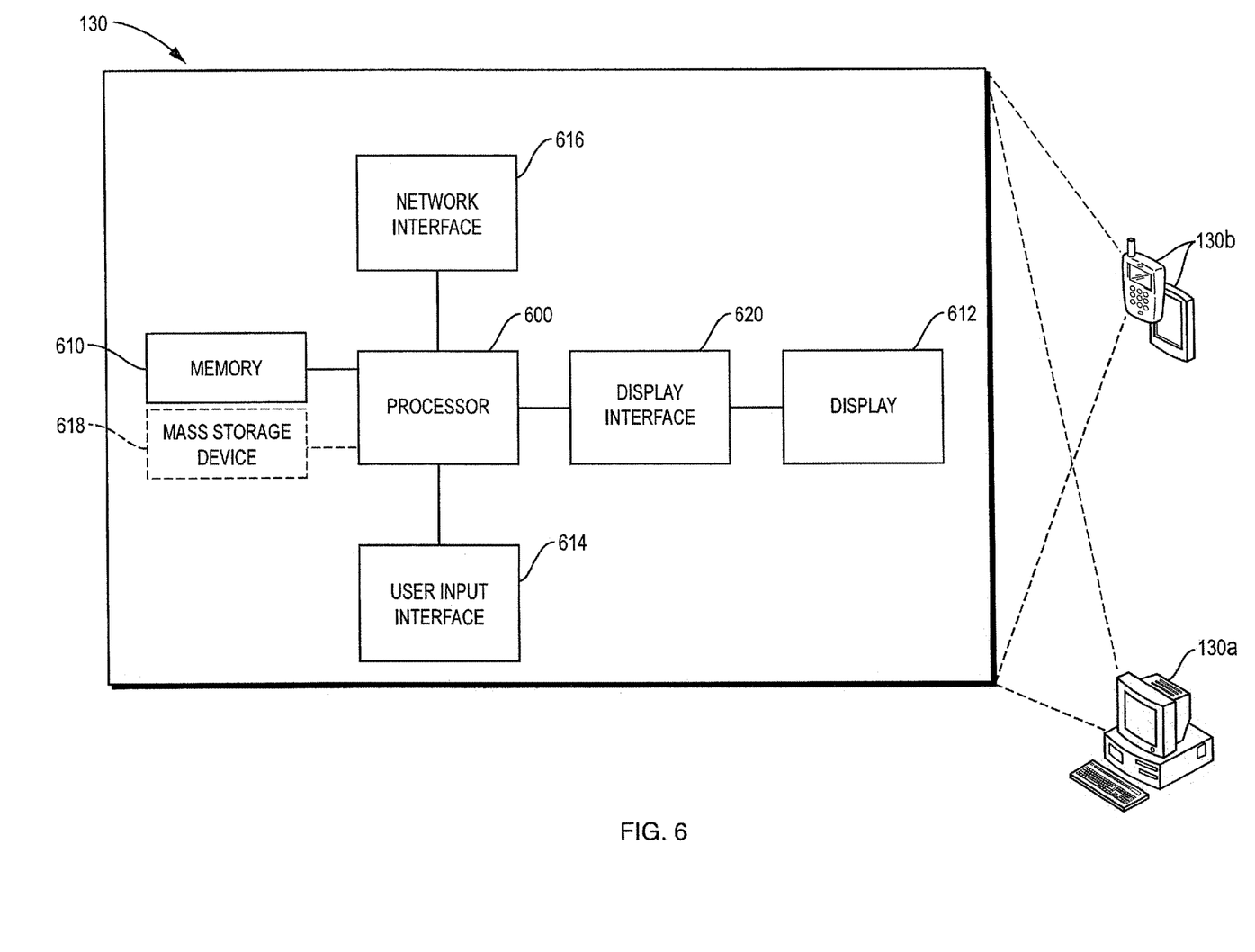
FIG. 6 is a functional block diagram of a controller of an audio system.

Referring to FIG. 6, an exemplary controller 130 includes a processor 600, a memory 610, a display 612, a user input interface 614, and a network interface 616, among other components. The controller 130 may also be provided with a mass storage device 618, such as a hard drive, a microdrive, or other device, to provide additional storage. Each of the processor 600, the memory 610, the display 612, and the network interface 616 are interconnected using various buses, and several of the components may be mounted on a common motherboard or in other manners as appropriate. The processor 600 can execute instructions (e.g., software) within the controller 130, including instructions stored in the memory 610 or in a secondary storage device (e.g., mass storage device 618). The processor 600 may be implemented as a chipset of chips that include separate and multiple analog and digital processors. The processor 600 may provide, for example, for coordination of other components of the controller 130, such as control of user interfaces, applications run by the controller 130, and network communication by the controller 130. The processor 600 may communicate with a user through the display 612 and the user input interface 614.

The processor 600 may communicate with the user through a display interface 620 coupled to the display 612. The display 612 may include an LCD monitor, or a touch sensitive display (e.g., in the case of a mobile device). The display interface 620 may comprise appropriate circuitry for driving the display 612 to preset graphical and other information to the user.

The user input interface 614 may include one or more user input devices such as a keyboard, a pointer device such as a mouse, and/or a touch sensitive display. In some cases, the same device (e.g., a touch sensitive display) may be utilized to provide the functions of the display 612 and the user input interface 614.

The network interface 616 facilitates wireless communication (e.g., Wi-Fi, Bluetooth, IR, etc.) with one or more of the audio playback devices (item 110, FIG. 1) via a corresponding network interface (item 520, FIG. 5C) on the audio playback device 110.

The memory 610 stores information within the controller 130. In some implementations, the memory 610 is a volatile memory unit or units. In some implementations, the memory 610 is a non-volatile memory unit or units. The memory 610 may also be another form of computer-readable medium, such as magnetic or optical disk.

The mass storage device 618 is capable of providing mass storage for the controller 130. In some implementations, the mass storage device 618 may be or contain a computer readable medium, such as a floppy disk device, a hard disk device, an optical disk device, or a tape device, a flash memory or other similar solid state memory device, or an array of devices.

Instructions (e.g., software) can be stored in an information carrier. The instructions, when executed by one or more processing devices (e.g., the processor 600), perform one or more processes, such as those described above. The instructions can also be stored by one or more storage devices such as computer- or machine-readable mediums (for example, the memory 610).

Figure 7:
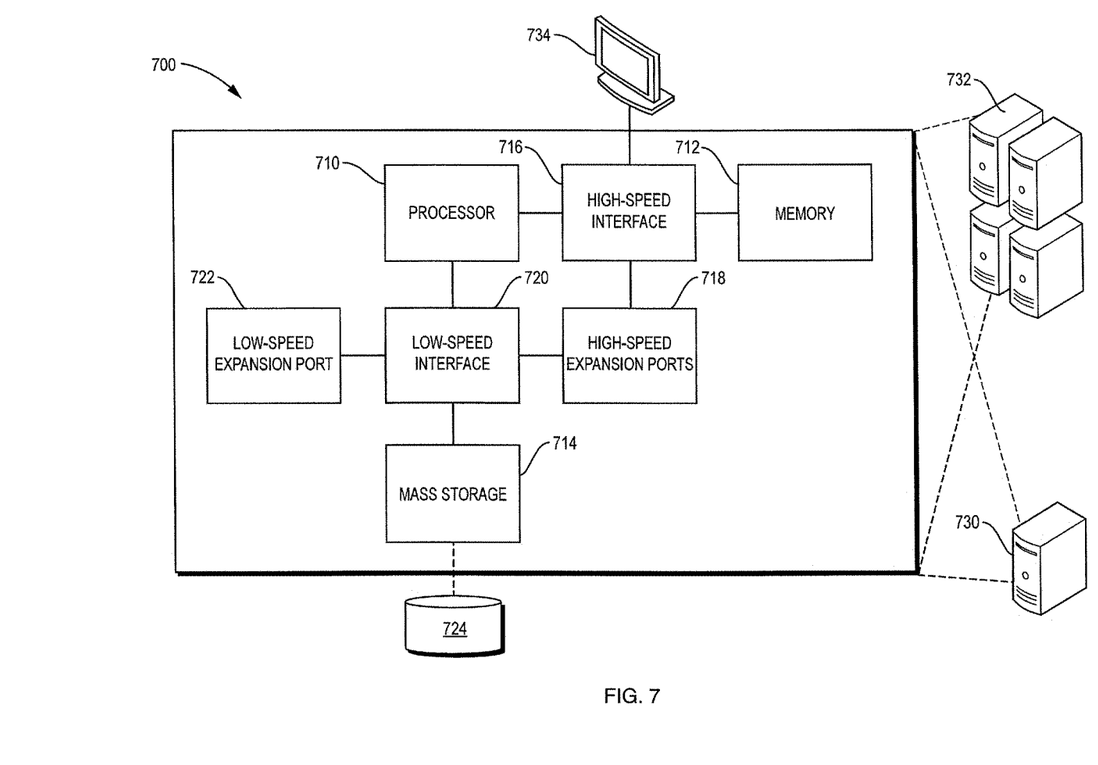
FIG. 7 is a functional block diagram of a computing device that can be used to implement a server of an audio system.

FIG. 7 illustrates an exemplary computing device 700 that can be utilized to implement the server (item 140, FIG. 1). The computing device 700 is intended to represent various forms of digital computers, such as servers, blade servers, mainframes, and other appropriate computers. The components shown here, their connections and relationships, and their functions, are meant to be examples only, and are not meant to be limiting.

The computing device 700 includes a processor 710, a memory 712, a storage device 714, a high-speed interface 716 connecting to the memory 712 and multiple high-speed expansion ports 718, and a low-speed interface 720 connecting to a low-speed expansion port 722 and the storage device 714. Each of the processor 710, the memory 712, the storage device 714, the high-speed interface 716, the high-speed expansion ports 718, and the low-speed interface 720 are interconnected using various busses and may be mounted on a common motherboard or in other manners as appropriate. The processor 710 can process instructions (e.g., a software program) for execution within the computing device 700, including instructions stored in the memory 712 or on the storage device 714 to display graphical information for a graphical user interface (GUI) on an external input/output device, such as a display 734 coupled to the high-speed interface 716. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 712 stores information within the computing device 700. In some implementations, the memory 712 is a volatile memory unit or units. In some implementations, the memory 712 is a non-volatile memory unit or units. The memory 712 may also be another form of computer-readable medium, such as a magnetic or optical disk.

The storage device 714 is capable of providing mass storage for the computing device 700. In some implementations, the storage device 714 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 710), perform one or more processes, such as those described above. The instructions can also be stored by one or more storage devices such as computer-readable mediums (for example, the memory 712, the storage device 714, or memory on the processor 710). The storage device 714 may provide storage for a database 724. The database can be used to store audio system account information.

The high-speed interface 716 manages bandwidth-intensive operations for the computing device 700, while the low-speed interface 720 manages lower bandwidth-intensive operations. Such allocation of functions is an example only. In some implementations, the high-speed interface 716 is coupled to the memory 712, the display 734 (e.g., through a graphics processor or accelerator), and to the high-speed expansion ports 718, which may accept various expansion cards (not shown). In the implementation, the low speed interface 720 is coupled to the storage device 714 and the low-speed expansion port 722. The low-speed expansion port 722, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 730, or multiple times in a group of such servers 732. It may also be implemented as part of a rack server system.

Implementations of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. An audio system, comprising:
  a plurality of audio playback devices that are each configured to operatively connect to a digital audio source for playback of content from the digital audio source, wherein the audio playback devices each comprise a unique identifier that distinguishes each audio playback device from all of the other audio playback devices;
  a control device;
  a server that comprises memory that is configured to store data relating to users who hold an audio system account, the data comprising the unique identifiers of audio playback devices associated with the account holder;
  wherein each of the audio playback devices is configured to communicate its unique identifier with the server;
  wherein the control device is configured to communicate with each of the audio playback devices and the server;
  wherein each audio playback device is configured to store tokens that represent credentials of account holders with account based digital audio services, wherein the tokens allow the audio playback device to access account based digital audio services with which the account holder has a digital audio service account; and
  a software program configured to run on the control device, wherein the software program provides a user interface configured to present to a first account holder a selection of whether an audio playback device will be public and thus available to be accessed and used by other account holders or private and thus not available to be accessed and used by other account holders;
  wherein in response to the first account holder making a selection of whether an audio playback device will be public or private, an audio playback device access control is provided, wherein the access control is configured such that:
    if an audio playback device is public, another account holder is able to access the public audio playback device, cause the addition of the unique identifier of the public audio playback device to the other account holder's audio system account, and cause the public audio playback device to store tokens for the other account holder; and
    if an audio playback device is private, another account holder is not able to access the private audio playback device, cause the addition of the unique identifier of the private audio playback device to the other account holder's audio system account, or cause the private audio playback device to store tokens for the other account holder;
  wherein the software program that is configured to run on the control device also provides a user interface that is configured to allow an account holder to select to add a particular playback device to the account holder's audio system account, causing the server to query its stored data to determine if the unique identifier of the particular playback device is stored in memory and if the particular playback device is public or private;
  wherein if the unique identifier of the particular playback device is stored in the server memory and the particular playback device is public the server adds the unique identifier of the particular playback device to the account holder's audio system account, and if the unique identifier of the particular playback device is stored in the server memory and the particular playback device is private the server does not add the unique identifier of the particular playback device to the account holder's audio system account.

2. The audio system of claim 1, wherein the access control is further configured such that any account holder with access to an audio playback device is able to make a selection to change a public audio playback device to private or change a private audio playback device to public.

3. The audio system of claim 1, wherein an audio system account comprises an identification of all audio playback devices that can be accessed by the account holder.

4. The audio system of claim 3, wherein the access control is further configured such that an account holder can add any public audio playback device to the account holder's account.

5. The audio system of claim 4, wherein the access control is further configured such that if a particular public audio playback device is made private, all account holders who had added the particular audio playback device to the respective account holder's account while the audio playback device was public are still able to access the particular audio playback device after it has been made private.

6. The audio system of claim 1, wherein the plurality of audio playback devices are each either public or private, wherein the access control is further configured such that all other account holders can access all public audio playback devices and no other account holders can access any private audio playback device.

7. The audio system of claim 6, wherein multiple audio playback devices can be grouped to function together as a unit, and wherein the access control is further configured such that if a first account holder does not have access to all of the audio playback devices in the unit, then the first account holder is invited to add one or more of the audio playback devices of the unit to the first account holder's account if those one or more of audio playback devices of the unit are public.

8. The audio system of claim 7, wherein the access control is further configured such that if a first account holder does not have access to all of the audio playback devices in the unit, then the first account holder's access to the unit is restricted if any audio playback devices in the unit are set to private and have not already been associated with the first account holder's account.

9. The audio system of claim 6, wherein multiple audio playback devices can be grouped to function together as a unit, and wherein the access control is further configured such that if the unit is public, other account holders are able to access and control the unit and if the unit is private, other account holders are not able to access or control the unit.

10. The audio system of claim 9, wherein the access control is further configured such that any account holder with access to a unit can individually access and control all audio playback devices of the unit.

11. The audio system of claim 1, wherein the audio system account comprises an identification of any audio playback device that can be accessed by the account holder and an identification of account based digital audio services with which the account holder has an account.

12. The audio system of claim 11, wherein the access control is further configured such that when another particular account holder gains access to an audio playback device, the tokens that allow the audio playback device to access account based digital audio services with which the particular account holder has an account are stored in the audio playback device.

13. The audio system of claim 1, wherein the audio playback device is further configured to operatively connect to a virtual personal assistant that is configured to communicate with the audio playback device so as to control the audio playback device by voice commands.

14. The audio system of claim 1, wherein the audio playback device is further configured to store an assignment of an entity associated with a digital audio source to a preset indicator on the audio playback device, and wherein the preset is available to any account holder with access to the audio playback device.

15. An audio system server that comprises memory that is configured to store data relating to users who hold an audio system account, the data comprising unique identifiers of audio playback devices associated with the account holder, wherein the server is configured to communicate with a plurality of audio playback devices that are each configured to operatively connect to a digital audio source for playback of content from the digital audio source, wherein the audio playback devices each comprise a unique identifier that distinguishes the audio playback device from all of the other audio playback devices, wherein each audio playback device is configured to communicate its unique identifier with the server and is further configured to store tokens that represent credentials of account holders with account based digital audio services, wherein tokens allow the audio playback device to access account based digital audio services with which the account holder has a digital audio service account, and wherein the server is further configured to communicate with a control device, the server comprising:
  a processor; and
  instructions stored on non-transitory computer-readable media that, when executed, cause the processor to:
  receive from a first account holder information regarding a selection of whether of an audio playback device that is configured to operatively connect to a digital audio source for playback of content from the digital audio source will be public and thus available to be accessed and used by other account holders or private and thus not available to be accessed and used by other account holders; and
  in response, establish an audio playback device access control wherein:
    if an audio playback device is public, another account holder is able to access the public audio playback device, cause the addition of the unique identifier of the public audio playback device to the other account holder's audio system account, and cause the audio playback device to store tokens for the other account holder; and
    if an audio playback device is private, another account holder is not able to access the private audio playback device, cause the addition of the unique identifier of the private audio playback device to the other account holder's audio system account, or cause the private audio playback device to store tokens for the other account holder;
  wherein the instructions stored on non-transitory computer-readable media, when executed, and in response to receiving from a control device of an account holder a selection to add a particular playback device to the account holder's audio system account, further cause the processor to cause a query of the server's stored data to determine if the unique identifier of the particular playback device is stored in memory and if the particular playback device is public or private;
  wherein if the unique identifier of the particular playback device is stored in the server memory and the particular playback device is public the server adds the unique identifier of the particular playback device to the account holder's audio system account, and if the unique identifier of the particular playback device is stored in the server memory and the particular playback device is private the server does not add the unique identifier of the particular playback device to the account holder's audio system account.

16. A method for establishing an accessibility to users who hold an audio system account of a plurality of audio playback devices that each comprise a unique identifier that distinguishes the audio playback device from all other audio playback devices and is configured to operatively connect to a digital audio source for playback of content from the digital audio source and is configured to communicate its unique identifier with a server that comprises memory that is configured to store data relating to users who hold an audio system account, the data comprising the unique identifiers of audio playback devices associated with the account holder, wherein each audio playback device is configured to store tokens that represent credentials of the account holder with account based digital audio services, wherein the tokens allow the audio playback device to access account based digital audio services with which the account holder has a digital audio service account, and wherein the server is further configured to communicate with a control device, the method comprising:

presenting to a first account holder a selection of whether an audio playback device will be public and thus available to be accessed and used by other account holders or private and thus not available to be accessed and used by other account holders;

in response to the first account holder making a selection of whether the audio playback device will be public or private, establishing an audio playback device access control wherein:

if an audio playback device is public, other account holders are able to access the public audio playback device, cause the addition of the unique identifier of the public audio playback device to the other account holder's audio system account, and cause the public audio playback device to store tokens for the other account holder; and if an audio playback device is private, other account holders are not able to access the private audio playback device, cause the addition of the unique identifier of the private audio playback device to the other account holder's audio system account, or cause the private audio playback device to store tokens for the other account holder;

presenting to the first account holder a selection of whether to add a particular playback device to the account holder's audio system account, and in response causing the server to query its stored data to determine if the unique identifier of the particular playback device is stored in memory and if the particular playback device is public or private;

wherein if the unique identifier of the particular playback device is stored in the server memory and the particular playback device is public the server adds the unique identifier of the particular playback device to the account holder's audio system account, and if the unique identifier of the particular playback device is stored in the server memory and the particular playback device is private the server does not add the unique identifier of the particular playback device to the account holder's audio system account.

* * * * *